March 9, 1954  W. R. HAMILTON  2,671,290
BAIT BUCKET
Filed Nov. 6, 1950  3 Sheets-Sheet 1
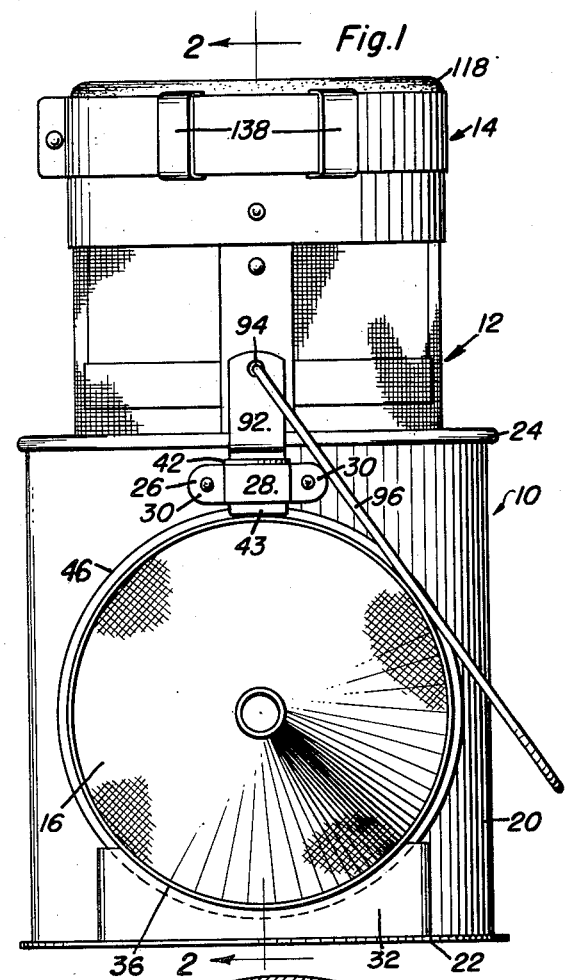
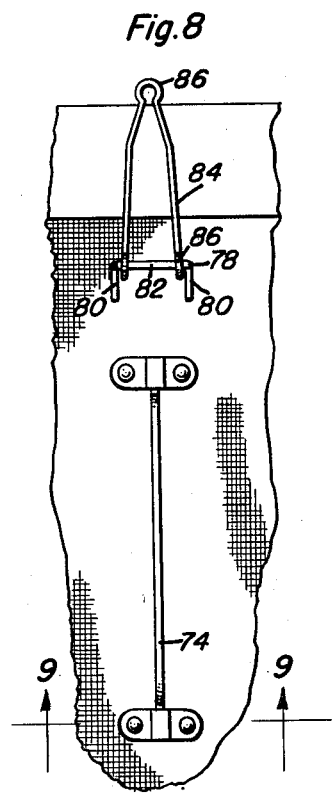
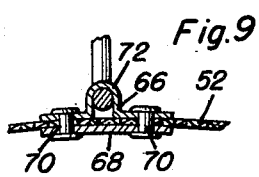
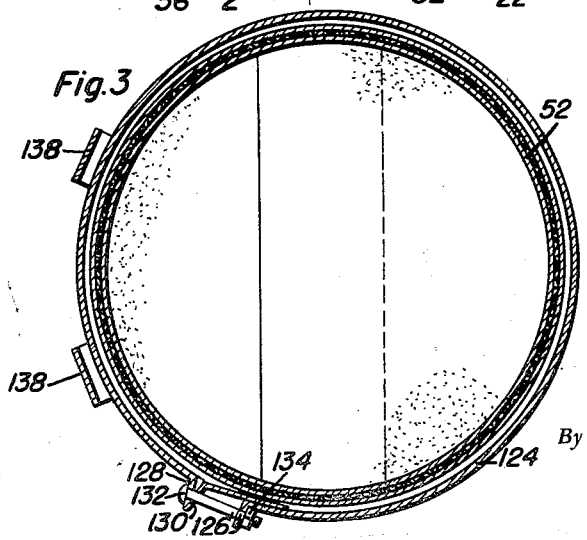
Inventor
William R. Hamilton
By Clarence A. O'Brien
and Harvey B. Jacobson
Attorneys

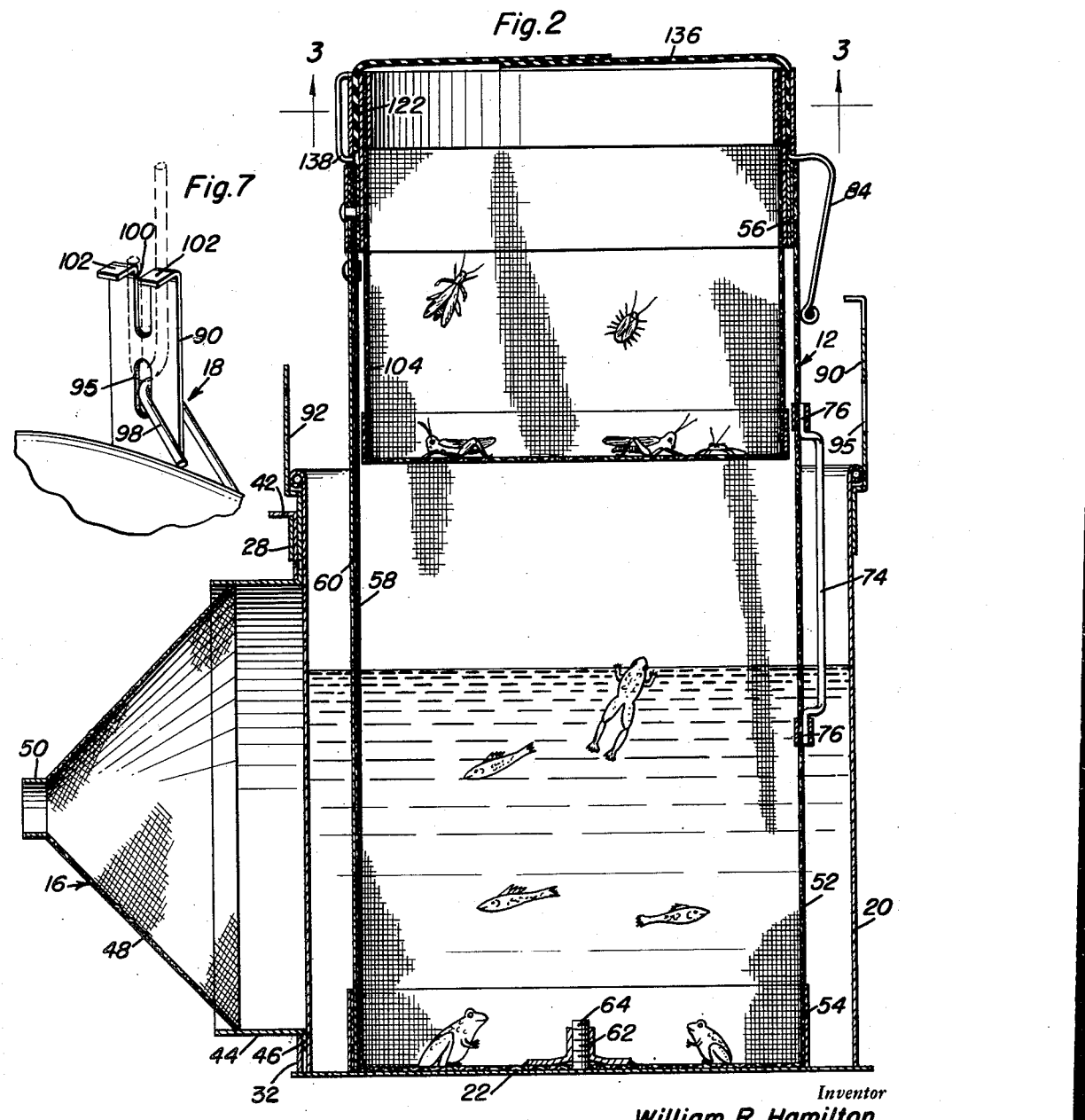

March 9, 1954 — W. R. HAMILTON — 2,671,290
BAIT BUCKET
Filed Nov. 6, 1950 — 3 Sheets-Sheet 3
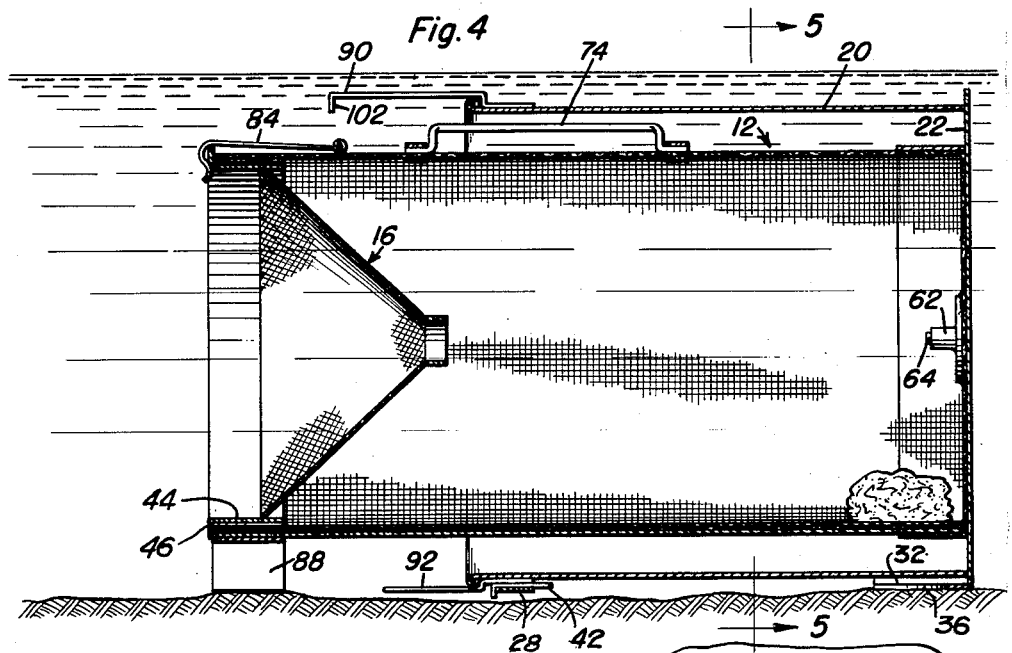
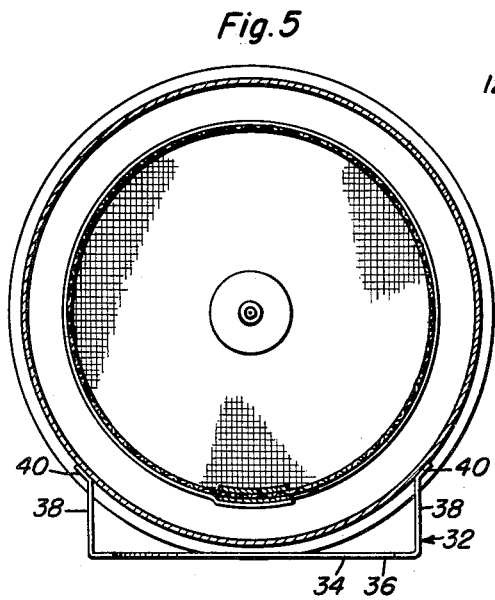
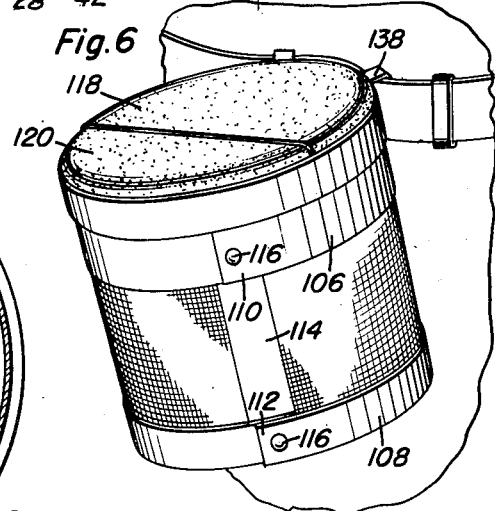
Inventor
William R. Hamilton Patented Mar. 9, 1954

2,671,290

UNITED STATES PATENT OFFICE 2,671,290

BAIT BUCKET

William R. Hamilton, Weir, Kans., assignor of fifty per cent to Carl D. Brown, Weir, Kans.

Application November 6, 1950, Serial No. 194,223

1 Claim. (Cl. 43—56)

The present invention relates to improvements in bait buckets, and more particularly to the type of bucket wherein means are provided for forming the bucket into a trap and means are provided for insertion into the open upper ends of the bucket for holding insects and the like.

An object of the present invention is to provide a novel combination bait bucket wherein means are provided for trapping minnow and the like and for holding minnow and frogs in a liquid container with an insect container supported thereover and forming the closure therefor.

A further object of the present invention resides in a novel arrangement whereby the wire mesh trap container is removably secured to the base of the imperforate bucket.

Still another object of the present invention resides in the novel funnel-like trap closure which is removably positionable in the open upper end of the perforate bait container and wherein the imperforate bucket is provided with means for supporting the same when not in use.

Still another object of the present invention resides in the novel arrangement of the handle for the bucket for preventing swinging movement of the bucket with respect to the handle.

The invention also comprises novel details of construction and novel combinations and arrangements of parts, which will more fully appear in the course of the following description. However, the drawings merely show and the following description merely describes embodiments of the present invention, which are given by way of illustration or example only.

In the drawings:

Figure 1 is a front elevational view of the bait bucket showing the insect container mounted thereon and the trap closure secured to the side of the bucket;

Figure 2 is a vertical sectional view taken substantially along the plane of line 2—2 of Figure 1;

Figure 3 is a horizontal transverse sectional view taken substantially along the plane of line 3—3 of Figure 2;

Figure 4 is a longitudinal sectional view showing the bait bucket being employed as a trap with the trap closure secured in the open end of the perforate bait container;

Figure 5 is a vertical transverse sectional view taken substantially along the plane of line 5—5 of Figure 4;

Figure 6 is a perspective view of the insect container showing it supported on the belt of the fisherman;

Figure 7 is a detailed perspective view of the bracket and handle arrangement;

Figure 8 is a broken view of a portion of the bait bucket showing a handle thereon and a latch whereby the trap closure may be latchingly held thereby; and Figure 9 is a detailed sectional view taken substantially along the plane of line 9—9 of Figure 8.

Referring more particularly to the drawings, wherein like numerals designate like parts throughout, the numeral 10 designates generally the bait bucket, the numeral 12 designates generally the perforate bait container, the numeral 14 designates generally the insect container, the numeral 16 designates generally the trap closure and the numeral 18 designates generally the bracket and handle arrangement.

The bait bucket means 10 is formed from a metallic can of cylindrical form having a tubular upstanding wall 20 with a base wall 22 secured to the bottom edge thereof for closing the same. The upper edge of the can 10 is rolled over at 24. The can 10 is also provided with means for holding the trap closure 16, which means includes the bracket 26 which is formed with an offset portion 28 and two ears 30, the ears 30 being secured to the tubular portion 20 of the can 10 by means of rivets or the like. Looking now at Figures 1 and 5, the bracket, or rest 32 which is employed for holding the trap closure 16 on the can 10 is shown as being formed of a flat strap 34 having an arcuate recess 36, angulated arms 38 and attaching ends 40. The attaching ends 40 of the bracket 32 may be secured to the tubular wall 20 of the can 10 by weld or other conventional means.

The bracket 26 is provided with a reciprocable latching element 42 which is simply a metallic angular strap which is slidably received beneath the offset portion 28 of the bracket 26.

The trap closure 16 which is adapted to be mounted on the exterior of the can 10 when not in use will now be described. The closure is formed from a substantially tubular mouth member 44 having a radially extending flange 46. A funnel-shaped perforate member 48 is secured to the tubular member 44 at its largest diameter. The funnel-shaped member 48 may be formed from wire mesh or the like and may be secured to the tubular member 44 by spot weld or the like. The closure 16 is formed with a reduced tubular end 50 which is secured to the smaller diameter of the mesh 48, permitting minnow and the like to pass therethrough for entrapment.

It will readily be seen that the trap closure 16 may be secured on the exterior of the can 10 when not in use by simply raising the latching element 42 and positioning the peripheral flange 46 on the arcuate recess 36 and then dropping the latching element 42 so that the end 43 thereof engages the upper portion of the peripheral flange 46 for retention thereby.

The inner perforate bait container 12 is best shown in Figures 2 and 4. The container 12 includes a substantially cylindrical wire mesh container 52 having rigidifying means in the form of rings 54 and 56, the ring 54 being secured to the exterior of the base portion of the mesh 52 and the ring 56 being secured to the interior of the upper open end of the mesh 52. A pair of longitudinally extending metallic straps 58 and 60 embrace opposite sides of the mesh 52 and extend from the lower ring 54 to the upper ring 56, being secured to the container by means of weld or the like. Centrally disposed on the bottom wall of the wire mesh 52 is a centrally apertured and internally threaded member 62. The base wall 22 of the can 10 is provided with an upstanding threaded lug 64 which is centrally disposed thereon, and when it is desired to secure the bait container 12 within the can 10, the lug 64 is threadably received within the member 62 and the bait container 12 is securely held to the can 10 thereby.

The wire mesh container 52 is provided with a pair of securing elements 66 and cooperating elements 68, the cooperating elements 68 being positioned on the inner surface of the wire mesh 52 and the bracket element 66 being mounted on the exterior surface of the wire mesh 52 with rivets 70 securing the two together and forming holding loops 72 on the container 12. A handle element 74 is provided with offset angulated ends 76 which are received within the loop 72 for retention thereby.

The bait container 12 is also provided with a latching means which includes a securing loop 78 which is secured to the wire mesh by means of the angulated ends 80, the bight portion 82 forming a pivot pin for the latching element 84. The latching element 84 is formed with a pair of rings 86 at its lower end for pivotal mounting on the bight portion 82. The upstanding portion of the latching element 84 converges in a first plane and is arcuated in a second plane perpendicular to the first plane with an end portion 88 angulated with respect to the rest of the latching element 84.

As seen best in Figure 4, when the device is to be used as a minnow trap, the closure 16 is positioned within the open upper end of the container 12 and the latching element 84 is pivoted with the angulated portion 88 overlying the flange 46 of the closure 16 for retention thereby. It should be noted here that the container 12 is formed with an angulated member 88 which is of substantially the same form as the angulated member 32, except for the recess 36, and is in alignment therewith so that when the trap is positioned on the subterranean supporting surface, the trap will be held from rolling movement.

The handle and bracket means 18 of the present invention are best shown in Figures 1 and 7. A pair of brackets 90 and 92 are secured to opposite sides of the can 10 and are in upstanding relation. The bracket 92 is formed with an aperture 94 for receiving one hook end of the handle 96, while the bracket 90 is formed with an elongated slot 95 for receiving the opposite hook end 98 of the handle 96. The upper end of the bracket 90 is provided with an open ended slot 100 and the end portion of the bracket is angulated as at 102. It will readily be seen that when the bucket is to be carried, the handle 96 will be pivoted to an upwardly extending position and the hook 98 will be engaged between the angulated end portion 102 of the bracket 90 for holding the bucket from swinging movement relative to the handle 96.

The insect container means 14 includes a substantially cylindrical wire mesh container 104. The wire mesh container 104 is provided with a pair of rigidifying rings 106 and 108 which surround the upper and lower peripheries of the container 104 and have their ends in overlapping relation, as at 110 and 112. An upstanding rigidifying strap 114 underlies the overlapping portions 110 and 112 and rivets 116 extend through the rings and the straps for securement to the wire mesh container 104. The container 12 is formed with a flexible closure including a pair of rubber-like overlapping members 118 and 120 which have their peripheries surrounding the upper end of the continuer 12 as at 122.

As best seen in Figure 3, a clamping ring 124 is disposed around the upper end of the container 12, being formed with an angulated apertured end 126 and an intermediate angulated portion 128. The intermediate angulated portion 128 is also provided with apertures 130 and a bolt 132 extends through the apertures 130 and the apertured angulated end 126, with a nut 134 being secured thereon for drawing the two ends of the rings 124 together.

It will readily be seen that when the flexible closure elements 118 and 120 are positioned on the open upper end of the container 12, the rings 124 may be secured therearound and tightening of the nut 134 on the bolt 132 to clampingly hold the portions 122 in tight engagement with the periphery of the container 12. It will readily be seen that with the overlapping at 136 of the flexible elements 118 and 120, access to the interior of the container 12 may be readily had without danger of losing the insects contained therein.

The ring 124 is also provided with a pair of belt engaging loops 138 whereby the container 12 may be separately held on the person of the fisherman as shown in Figure 6.

As it is readily seen in Figures 1 and 2, the insect container 12 may be positioned within the open upper end of the bait container 52 in order that the fishing enthusiast may have various types of bait selectively at his command.

From the foregoing, it is believed that a device has been provided which will accomplish all of the objects hereinabove set forth. By forming the containers for the insects, minnows, frogs and the like, from wire mesh, a constant supply of fresh air is provided for the bait keeping them in top condition for baiting purposes. It will also be seen that by employing wire mesh, visibility of the bait is obtained whereby the selection of the bait is facilitated, not depending upon "feel."

Having described the invention, what is claimed as new is:

The combination with a bait bucket adapted for carrying therein a bait container of the type closed by a removable minnow trap closure, of a rest on one side of the bucket for supporting one side of said trap closure when removed, and a slide on said side of the bucket slidable toward said rest into engagement with the opposite side of said trap closure to removably hold the trap closure on said rest.

WILLIAM R. HAMILTON.

References Cited in the file of this patent

UNITED STATES PATENTS

| Number | Name | Date |
|---|---|---|
| 245,145 | Emmons | Aug. 2, 1881 |
| 311,346 | McKinney | Jan. 27, 1885 |
| 321,606 | Hough | July 7, 1885 |
| 435,211 | Darrah | Aug. 26, 1890 |
| 656,655 | McCurdy | Aug. 28, 1900 |
| 710,325 | Kern et al. | Sept. 30, 1902 |
| 778,340 | Stuber | Dec. 27, 1904 |
| 814,480 | Saffell | Mar. 6, 1906 |
| 816,251 | Petmecky | Mar. 27, 1906 |
| 1,073,353 | Kraning | Sept. 16, 1913 |
| 1,140,625 | Spitzler | May 25, 1915 |
| 1,390,766 | Cunningham | Sept. 13, 1921 |
| 1,429,630 | Rebideau | Sept. 19, 1922 |
| 1,587,785 | Marsh et al. | June 8, 1926 |
| 1,620,617 | Marsh et al. | Mar. 8, 1927 |
| 1,725,864 | James | Aug. 27, 1929 |
| 2,596,974 | Angelo | May 20, 1952 |